United States Patent
Bratt

[15] 3,703,019
[45] Nov. 21, 1972

[54] SURFACE CONFORMING WEAR RESISTANT DOCTOR BLADE FOR ROLLS

[72] Inventor: Richard L. Bratt, Holden, Mass.
[73] Assignee: Norton Company, Worcester, Mass.
[22] Filed: Oct. 15, 1970
[21] Appl. No.: 81,019

Related U.S. Application Data

[63] Continuation-in-part of Ser. No. 833,659, June 16, 1969.

[52] U.S. Cl................................................15/256.51
[51] Int. Cl...........D21g 3/00, D21g 3/02, D21g 3/04
[58] Field of Search......76/104 R, 101 A, DIG. 11, DIG 12; 30/346.53, 346.6, 346.61; 15/256.51, 265.5, 93; 118/126

[56] References Cited

UNITED STATES PATENTS 1,855,330   4/1932   Zublin..................76/DIG. 11
2,361,554   10/1944   Lundbye..................76/104 X

FOREIGN PATENTS OR APPLICATIONS 557,535   5/1958   Canada..................15/256.51
1,002,699   4/1962   Great Britain
978,988   1/1965   Great Britain..........15/256.51

Primary Examiner—Leon G. Machlin
Attorney—Walter Fred

[57] ABSTRACT

A composite blade has a thin flat strip with a narrow wear land, adjoining a top leading edge thereof, that easily and quickly conforms to a relatively moving surface on a cylinder in engagement therewith, and a recessed strip of wear resistant material abutting and protected by the wear land. The wear resistant strip upon contacting the moving surface reduces and controls any further wearing of the wear land to a rate compatible thereto and thereby extends the useful life of the blade.

14 Claims, 9 Drawing Figures

PATENTED NOV 21 1972 3,703,019

INVENTOR
RICHARD L. BRATT
BY
Walter Fred
AGENT

SURFACE CONFORMING WEAR RESISTANT DOCTOR BLADE FOR ROLLS

CROSS-REFERENCE TO RELATED APPLICATION

This application is a continuation-in-part of co-pending application Ser. No. 833,659 filed June 16, 1969.

BACKGROUND OF THE INVENTION

1. Field of Invention

The invention relates to apparatus such as that for forming and processing material in sheet form, particularly it pertains to wear resistant doctor blades which contact a surface on a rotating cylinder moving relative thereto for various purposes such as cleaning the surface, removing the sheet from the surface, and creping the sheet of material.

2. Description of the Prior Art

Prior to applicant's invention, elements such as doctor blades have been constructed of plain strips of hard and soft materials. Also metal strips have been coated with wear resistant material surfaces which contact the moving surface.

The prior art soft blades wear out too quickly, have to be reground and replaced frequently, and the hard blades did not conform quickly to the contour of the engaged moving surface causing a delay in production. The coated blades were not only hard but the coating chipped away. All of these problems caused the equipment to be shut down frequently at a great expense to the user.

To solve these problems the applicant's blade combines the advantage of both hard and soft material and utilizes them in a manner whereby the soft material quickly conforms to the configuration of the moving surface and protects the edge of the harder wear resistant material which also contacts the moving surface and thereafter regulates the wear to extend the life of the blade.

In U.S. Pat. No. 3,446,702 is disclosed a drainage foil having a hard abrasion resistant insert within a slot and having a surface coplanar with a land portion of a surface engaged by a flexible wire screen of a Fourdrinier paper machine. Unlike the applicant's invention the purpose of the abrasion resistant insert is to prevent any rapid and irregular wear of the land portion and thereby prevent an increase in the land area, an increase in friction and drag on the wire, and a decrease in the area and effectiveness of the foiling portion of the structure.

The applicant's invention serves a non-analogous portion and purpose in similar machines. Specifically, the applicant's wear resistant blade is used in combination with a rigid rotating cylinder on which is a surface to which a narrow wear land adjacent a leading edge on the blade must conform. For proper operation, best results, and to maintain production it is important that the wear land be soft, subject to wear by, and conform quickly to the surface on the cylinder. Then after a short period of rapid wear, the surface on the cylinder contacts an edge of a bonded layer of wear resistant material which reduces and controls the rate of wear of the wear land. Additionally, the edge of the layer of resistant material abutts and is continually protected from damage by the wear land.

SUMMARY OF THE INVENTION

A relatively long thin flat strip of material has a leading edge and an adjacent side surface extending therefrom. The side surface has a recessed surface to which is bonded a long and narrow thin layer of wear resistant material, the forward edge of which is spaced from but close to the leading edge.

A long and narrow wear land or strip of softer material than the harder wear resistant material extends from the leading edge to the forward edge of the wear resistant material. In use the softer wear land conforms quickly to the curvature of the moving surface, abutts and protects the forward edge of the layer of wear resistant material which then contacts the drum to greatly reduce and control further wearing of the blade.

BRIEF DESCRIPTION OF THE DRAWINGS

The drawings show the invention specifically embodied as a creping blade.

DESCRIPTION OF THE PREFERRED EMBODIMENT(S)

Figure 1:
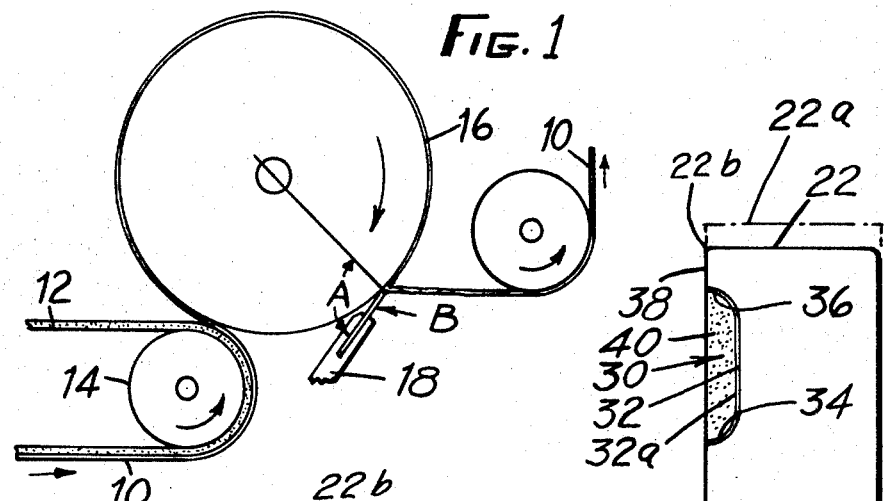
FIG. 1 is a partial diagrammatic side view of a creping station of a conventional sheet making machine in which the invention may be utilized.

FIG. 1 of the drawing discloses, as an example, a portion of a conventional paper making machine concerned with partially drying and creping a moving previously formed continuous fibrous sheet 10 of paper stock or the like. The continuous sheet 10 travels with an endless belt 12 partially around a roll 14 to a nip where the sheet 10 is separated from the belt 12. From the nip the sheet 10 continues in contact with a heated drying cylinder or drum 16, to a position where the paper sheet 10 contacts a wear resistant creping blade B held in a conventional holder 18 which presses and maintains the blade in contact with the moving surface of the drum 16. The blade B for this purpose is held at an angle A which is approximately 112° relative to a radial plane passing through the axis of rotation of the drum 16. When the moving paper sheet 10 contacts the top leading edge it is simultaneously creped and removed from the drum 16 after which it continues on around other rolls and drying drums of the machine.

Figure 4:
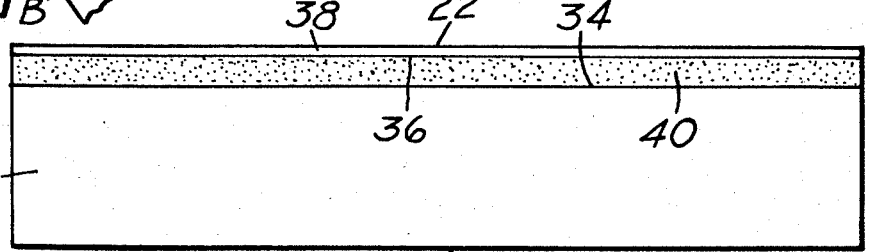
FIG. 4 is a front view on a reduced scale of the blade of FIG. 3.

The wear resistant blade B comprises a long thin flat strip 20 of substantially rectangular cross section approximately 0.020 to 0.060 of an inch thick. It has a relatively smooth top surface 22 and a bottom edge or surface 24 substantially parallel to the top surface 22. Extending between the top and bottom surfaces are opposed side surfaces 26 and 28 which are substantially parallel to each other. At the junction of the side and top surfaces 28 and 22 is a leading edge 22b. On the side surface 28 is a long shallow narrow slot or recess 30 which extends lengthwise of the blade substantially parallel to the leading edge 22b as shown in FIG. 4. In the slot 30 is a recessed surface 32 approximately 0.010 to 0.020 of an inch below the side surface 28. The slot has a width of about one-sixteenth to one-fourth of an inch and spaced side surfaces or opposed shoulders 34 and 36 of about one sixty-fourth to one thirty-second of an inch radius extending between the side and recessed surfaces 28 and 32. On the strip 20 is a narrow wear land or strip 38 approximately 0.005 to 0.030 of an inch wide extending between the shoulder 36 and the leading edge 22b for the entire length of the blade B. The length of the blade B from end to end is, in some applications, approximately 100 inches and which dimension varies for different machines. The blade B extends lengthwise across the width of the drum 16, the sheet 10, and transverse to the direction of travel of the sheet 10.

Within the slot 30 is a layer or strip 40 0.010 to 0.020 of an inch thick of wear resistant material bonded to the surface 32 and shoulders 34 and 36. The strip of wear resistant material is relatively much harder than the material at the wear land 38 and is preferably a material that may be applied in various ways. For example, the wear resistant strip 40 may be preformed out of solid material or material molded to form and bonded to the surface 32 with a metal, ceramic or resin bond. The wear resistant strip may be made by filling the slot 30 with a cermet or a plastic mixture consisting of particles of wear resistant material such as boron carbide and the materials disclosed hereinafter, and one of many of the conventional resinous bonding materials and cured in the well known manner.

Preferably, the wear resistant strip 40 is made by thermally spraying a ceramic material with any of the well known and commercially available thermal spray guns. The ceramic material may be thermally sprayed onto the prepared surface 32 in powder or in rod form such as taught in U.S. Pat. Nos. 2,707,691 and 3,261,673. Various well known wear resistant ceramic materials can be prepared in powder or rod form prior to spraying and include: metal oxides, carbides, borides, silicates and mixed compositions thereof. Conventional ceramic materials used for thermal spraying are alumina, chromia, chromia-alumina, alumina-titania, nickel oxide, aluminum silicate, zirconia, calcium zirconate, zirconium silicate, magnesium zirconate, magnesium aluminate, tungsten carbide, chromium carbide, zirconium carbide, tantalum carbide, titanium carbide, zirconium diboride, chromium diboride, titanium diboride, molybdenum diboride and mixtures thereof. Other wear resistant materials such as a nickel, chromium, and boron metal alloy may be used.

In some instances due to the environment in which the blade is utilized it may be desirable to provide a corrosion resistant metal undercoat 32a between the surface 32 and the strip, layer, or coating of wear resistant ceramic material 40. The metal undercoat may be applied for example, by thermal spraying, electroplating or spuddering the metal onto the surface 32. There is commercially available various metals in powder, wire and rod form which can be used as the metal undercoat. For example, stainless steel, molybdenum, bronze, nickel, chromium, nichrome, nickel aluminide, cobalt and alloys thereof.

Thermally sprayed as used herein is defined as any spray system or equipment having a high temperature source of heat which produces molten droplets of the material to be sprayed and projects them at high velocity onto the surface to be coated until a layer of sufficient thickness is built up. Two well known examples of thermal spraying are done with conventional flame and electrical plasma arc spray guns.

The strip 20 is preferably a metal strip and may be made of various hot and cold rolled steels, spring steel, stainless steel, monel metal, bronze, brass, nichrome, nickel, and alloys thereof. Also it may be made of metals which have been plated with corrosion resistant metals such as chromium, nickel, tin and nichrome. For some applications the strip 20 may be made of plastic materials which are rigid enough to withstand the pressure applied to the blade in use. However, the strip 20 is made from material which will, at least, provide a wear land 38 of less hardness than the wear resistant strip 40. A strip of K monel metal, commercially available, was found to be ideal for most applications.

Preferably, the blade B is manufactured by first planing, milling, grinding or molding the slot 30 in a preformed strip 20 of the preferred material, a predetermined distance from an initial top surface 22a of the preformed strip 20 shown in phantom lines. As a result the wear land 38 is initially greater in width than required of the finished product.

The planing, milling, grinding or molding tool may be formed to produce the shoulders 34 and 36 with the radius thereon. The side surface 28 is masked off leaving the recessed surface 32 and shoulders 34 and 36 exposed which are then roughened and cleaned by grit blasting in the well known manner.

If necessary or desired a metal undercoat 0.002 to 0.008 is then applied and in most instances nichrome metal is selected and thermally sprayed onto the surfaces 32, 34 and 36.

Next, the wear resistant ceramic material is thermally sprayed onto either the metal undercoat 32a or directly onto the roughened surfaces 32, 34 and 36 until it extends beyond the side surface 28 of the strip 20. Thereafter, the wear resistant ceramic material is ground down flat and smooth to lie on the same plane as the wear land 38 on the side surface which may also be ground. Finally, the initial top surface 22a is ground down flat and smooth to provide the finished leading edge 22b substantially parallel to the upper edge of the wear resistant strip 40 and the wear land 38 of the desired and substantially uniform width.

Figure 3:
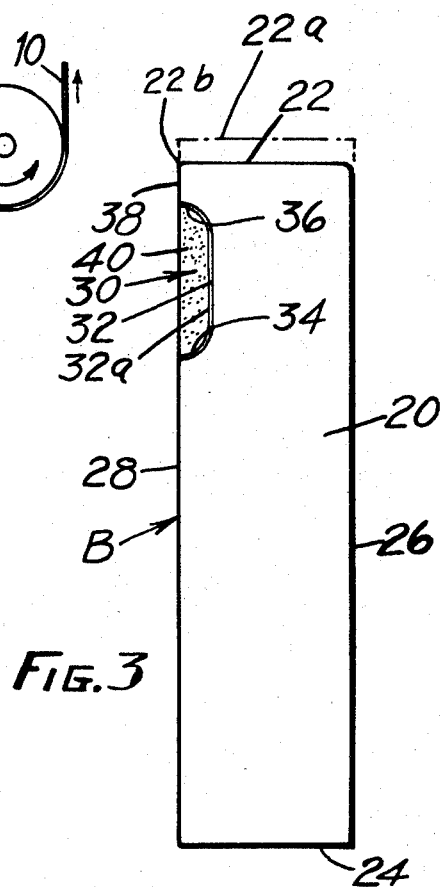
FIG. 3 is an enlarged end view of the blade of the invention before it contacts the drying drum.

The blade B is now ready to be mounted in a suitable holder for substantially line contact with a surface on the rotatable drum 16 and the paper sheet 10. As shown in FIG. 3, the narrow wear land 38 is substantially flat and is approximately at right angles to the leading edge 22b. However, in use the narrow wear land 38 of an extremely small area upon engaging the exceptionally large area and the continuous peripheral surface on the rotating drum 16 quickly wears and assumes the curvature of the surface on the drum until the wear resistant strip 40 contacts the surface on the drum. At this stage the rate of wear on the wear land 38 is greatly reduced and controlled by the wear rate of the wear resistant strip 40 which also assumes the curvature of the surface on the drum 16.

Figure 2:
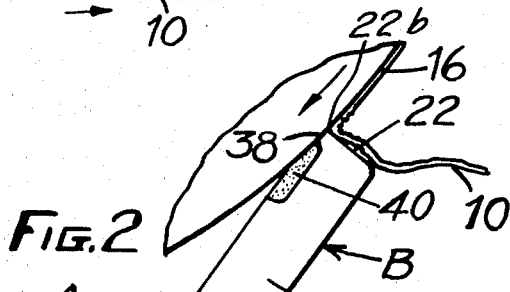
FIG. 2 is an enlarged fragmentary view of the wear resistant blade of the invention engaging and conformed to the curvature of a drying drum.

In FIG. 2 is shown a partially worn blade B held against the drum 16 and wherein both the wear land 38 and the wear resistant strip 40 have conformed to the large radius of curvature of the surface on the drum 16. Also shown is the paper sheet 10 being simultaneously removed and creped by the leading edge 22b and the top surface 22.

It will be noted that the wear resistant strip 40 of ceramic material has a forward or upper edge that is continuously engaged and protected by the shoulder 36 during the life of the blade B. The shoulder 36 of the wear land 38 abuts and prevents the forward edge from becoming chipped or otherwise damaged and the opposite shoulder 34 tends to resist the thrust exerted by the drum 16 against the wear resistant strip 40.

Alternatively, the slot 30 may be made wider than the strip of wear resistant material 40 or instead of a slot the recessed surface 32 could extend to the bottom edge 24 whereby the shoulder 34 is eliminated. In such a construction, the strip of wear resistant material 40 is bonded to the recessed surface 32 and the shoulder 36, or to the metal undercoat 32a applied thereto.

Figure 5:
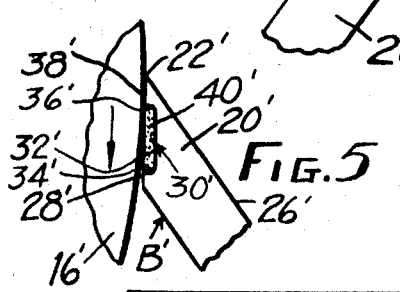
FIGS. 5, 6 and 7 are fragmentary views of modified forms of the invention.
Figure 6:
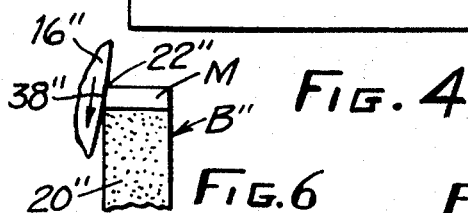
Figure 7:
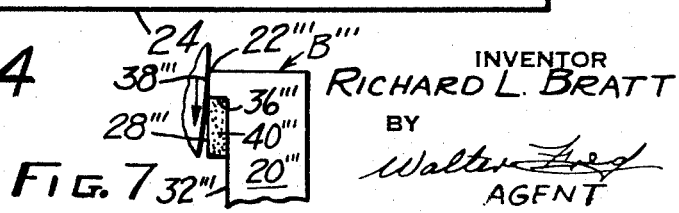

In FIG. 5, 6, and 7 are shown various modified forms of wear resistant blades of the invention.

The wear resistant blade B' of FIG. 5 comprises a strip 20' having a leading edge 22'. Extending from the leading edge 22' is a relatively shorter side surface 28' having a long shallow narrow slot or recess 30'. In the slot 30' is a recessed surface 32' between opposed shoulders 34' and 36'. The side surface 28' makes an angle of less than 90° between it and a side surface 26' and has a wear land 38' extending from the leading edge 22' to a forward edge of a layer or strip 40' of wear resistant material. The strip 40' is similarly recessed and bonded to either the recessed surface 32' or to a metal undercoat bonded to the surface 32'. The blade B' as shown in performing a doctoring operation on the drum 16' and presented to the drum in a different manner to show the utility of the invention.

Alternatively, a preformed strip of wear resistant material may be fixed within the slots 30 and 30' by what is known as either an interference or a shrink fit. This can be done by either making the slot slightly smaller than the preformed wear resistant strip of a corresponding configuration or by making the wear resistant strip slightly larger than the slot. Upon heating the flat strip 20 expands to increase the size of the slot into which the preformed strip of wear resistant material is placed, after which the strip is cooled to cause the strip to shrink, grip, and retain the wear resistant strip in the slot. Conversely, the strip of wear resistant material may be cooled to shrink it before inserting it into the slot after which it expands upon returning to normal room temperature and thereby retained in the slot.

Referring to FIG. 6 there is shown a wear resistant blade B'' comprising a flat strip 20'' preformed of wear resistant material and to which is bonded a softer layer or strip of metal M having a leading edge 22'' and a wear land 38'' extending therefrom to the strip 20''. The blade B'' may be made of the materials disclosed hereinabove and the metal layer or strip M may be either thermally sprayed or adhesively bonded to the wear resistant strip 20''.

FIG. 7 discloses a blade B''' which is a modified form of the blade B shown in FIG. 3 and comprises a flat strip 20''', a recessed surface 32''' that extends from a surface or shoulder 36''' extending from the wear land 38''' on a relatively shorter side surface 28'''. The wear land 38''' extends from a leading edge 22''' to and abuts a layer or strip 40''' of wear resistant material bonded to the strip 20''' in the manner taught above.

Figure 8:
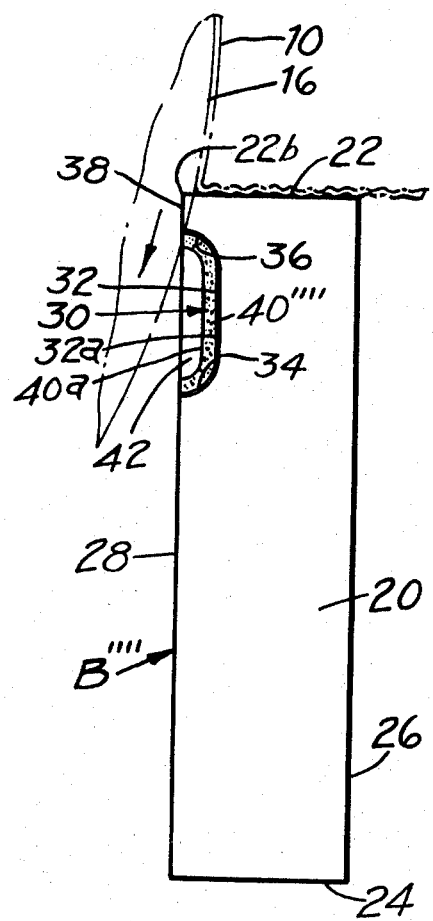
FIG. 8 is an enlarged view of a modified form of the wear resistant blade shown in FIG. 3.

In FIG. 8 there is shown a wear resistant blade B'''' which is a modified form of the blade B described above and shown in FIG. 3. It differs from the blade B only in the area and construction of the wear resistant strip 40. The preformed long thin flat strip 20 of the blade B'''' is preferably, as shown, the same as the long thin flat strip 20 described above for the blade B. Therefore like characters are used only to indicate like parts common to both blades B and B''''.

As shown blade B'''' comprises the elongated thin flat strip 20, including a top edge or surface 22, bottom surface 24, opposed side surfaces 26 and 28, a top or leading edge 22b, a slot or recess 30, a recessed surface 32 opposed shoulders 34 and 36 coated with a metal undercoat 32a, and a wear land 38 identical to that described above for blade B.

Applied and bonded to the undercoat 32a or directly to the recessed surface 32, when no undercoat is necessary, is a layer or strip of wear resistant material 40''''. The layer or strip of wear resistant material 40'''' may be a strip inserted into the slot and preformed to fit the contour of the surfaces 32 or 32a and the shoulder 34 and 36. Preferably it is applied by thermally spraying a substantially uniform layer of wear resistant material onto the surface 32 or 32a as taught above and then if necessary grinding the exposed surface of the layer of wear resistant material with a preformed grinding wheel to form an outer recessed surface 40a substantially parallel to either the recessed surface 32 or surface of the undercoat 32a and the shouldered surface, 34 and 36.

The strip or layer 40'''' of wear resistant material is finished to be preferably 0.005 to 0.070 of an inch thick measured from the outer recessed surface 40a and extends to the wear land 38 on the side surface 28 as shown. Above the recessed wear resistant surface 40a is formed a second outer shallow recess or slot in the wear resistant strip 40'''' into which is recessed or filled with a preformed backing strip or backing layer 42 of material softer than that of the wear resistant strip 40''''. The backing strip or layer 42 is bonded to the layer or strip 40'''' of wear resistant material in any suitable well known manner. For example, a preformed backing strip of material having substantially the same characteristics and properties as the strip 20 could be adhesively bonded to the strip 40'''' of wear resistant material. A backing layer 42 of metal such as K monel having substantially the same wearing properties and hardness as the wear land is preferably thermally sprayed onto and mechanically bonded to the wear resistant strip 40'''' in the well known manner.

Alternatively, molten metal could be poured into the second shallow recess and allowed to solidify therein. Thereafter, the backing layer 42 the ends of the wear resistant strip 40'''' and, if necessary, the wear land 38 are ground down until they lie in a single plane preferably on the same plane as the side surface 28 as shown. The excess initial surface 22a is then ground to provide the surface 22 and leading edge 22b substantially parallel to the upper edge of the strip 40'''' in the manner taught above.

Another method of making the wear resistant blade B'''' would be to first make a composite insert comprising applying and bonding a preformed strip or layer 40'''' of the wear resistant material to the preformed backing strip or layer 42 of softer material, grinding the wear resistant layer or strip 40'''' to the proper contour of and adhesively bonding a preformed strip or layer 40'''' of the wear resistant material to the preformed backing strip or layer 42 of softer material, grinding the wear resistant layer or strip 40'''' to the proper contour of and adhesively bonding the composite insert to either of the surface 32 or coating 32a.

It can be seen that varying the thickness of the wear resistant strip 40'''' will cause a corresponding change in the area of contact with the moving surface. Hence, the wear rate of the wear resistant strip 40'''' can be varied and controlled. Another factor is that a substantially constant area of contact is provided with the moving surface of either the drum 16 or of the material thereon during the life of the blade B''''. In use the wear land quickly conforms to the curvature of the moving surface and then the narrow layer of wear resistant material 40'''' begins to wear and assume the curvature. Thereafter the softer layer of strip 42 is contacted by and begins to conform to the curvature of the moving surface. From then on the rate of wear of the wear land 38 and the backing strip 42 is controlled by the strip of wear resistant material 40'''' supported in between them.

In some applications it is desirable to have a wear resistant blade B'''' which is constructed to slow down but not stop the wear to the extent that the blade B would. Allowing the substantially uniform layer 40'''' of wear resistant material to wear at a moderate rate provides a faster and constant redressing action thereof by the relatively moving surface. For example, should minute particles pull out or break away from the lead edge of the wear resistant strip 40'''' and leave an undesirable ragged edge, it would redress itself in much less time than would a similar ragged edge on the slower wearing resistant strip 40 of the blade B. Further, the layer or strip 42 of softer material acts as a back-up strip for the thin wear resistant coating, layer, or strip 40'''' and prevents it from breaking away, and from becoming so excessively rough and ragged that it can no longer be redressed or used to engage the moving surface.

Figure 9:
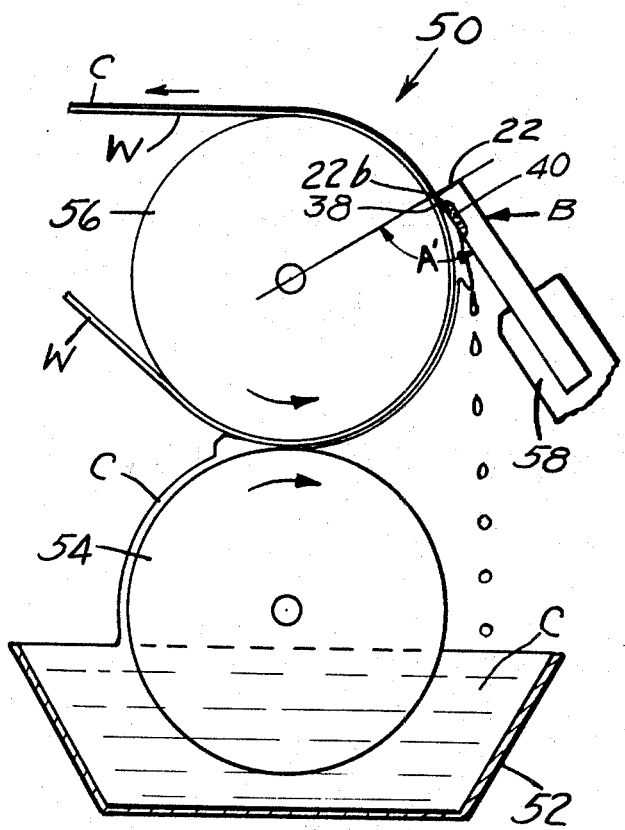
FIG. 9 is a diagrammatic view of the wear resistant blade arranged to apply a coating to a web of material moving over a support drum.

The wear resistant blades B, B', B'', B''', and B'''' described above have been, by example, applied to engaging a surface moving in a direction towards the edge 22 for the purpose of simultaneously doctoring or cleaning the moving surface and creping the material on the moving surface. In FIGS. 1 and 8 the surface on the drum 16 is shown moving clockwise towards the edge 22b, surface 22, and the strip of wear resistant materials 40 and 40'''' are displaced from the top surface 22 in the direction of movement. In FIG. 9 there is shown a portion of one type of conventional coating mechanism 50 for applying a coating C of conventional coating material to a continuous web W of a conventional material, such as, cloth, paper, etc. The coating mechanism 50 shown comprises a reservoir 52 of liquid coating material through which is rotated a coating roller 54 which transfers an excess amount of the coating material C to a web material W entering a nip between the coating cylinder or roll 54 and a rotatable web supporting cylinder or roll 56. The web W is guided into the nip by conventional roller means not shown and held in contact with the support roll 56 which carries the web W and the coating material C deposited thereon towards a wear resistant blade B of the instant invention being utilized as a coating or metering blade. Alternatively, anyone of the modified forms B', B'', B''', and B'''' of the wear resistant blades disclosed above may be used instead of the coating or metering blade B shown. The wear resistant blade B can be mounted in various positions but is in this instance held in a suitable conventional holder 58 to extend above the horizontal axis of the cylinder 56 and at an angle A' greater than 90° from a plane passing radially through the axis of the support roll 56. As shown, the cylinder or roll 56 and the moving surface of the web W of material being coated moves counter clockwise or away from the top surface 22 and the edge 22b. Hence, the wear resistant material 40 is displaced from the leading edge 22b and the top surface 22 in a direction opposite to the movement of the moving surface of the material on the cylinder or roll 56. Hence the edge or the leading edge 22b can be referred to as a trailing edge since the moving surface moves away from it.

The web W may be coated with various conventional types of materials, apparatus and methods well known in the art. However, the wear resistant blade B of the invention is most useful for applying coating materials that tend to produce an abrasive action which quickly wear out conventional blades. Coating material, such as, a mixture of starch, glue, and a mineral filler do not appear to be abrasive but are known to quickly abrade conventional coating blades.

Typically coating blades and the wear resistant blade B are held in a conventional apparatus, not shown, which can be adjusted to apply and press the blade at various desired uniform pressures against the moving surface of the web W. Thus the coating blade merely smooths the moving surface by troweling a very light film and filling any depressions with the coating material. For example, a blade uniformly pressing against the moving surface at 5 pounds per linear inch of the blade and situated at an angle of between 20° to 25° from a plane tangent to the moving surface of a web approximately 0.012 thick will apply approximately a 0.002 thick film of the coating material. Hence the total thickness of the web plus the coating is approximately 0.014 of an inch.

In use the coating material and/or the moving surface of the web tends to rapidly wear the wear land 38 down to the wear resistant strip 40 and conform it to the curvature of the moving surface of a radius corresponding to the distance away from the axis of rotation of the cylinder or roll 56. From then on the wear land 38 and the wear resistant material 40 wears to the same curvature at a wear rate controlled by the wear resistant strip 40. Obviously, there is considerably less pressure being exerted against a blade B used for coating than for creping. Therefore, the narrow wear land is substantially unaffected by the reverse thrust and counter clockwise movement of the surface of the web and/or coating material C and tends to support and prevent the edge of the wear resistant strip 40 from breaking away. Further, the lower surface portion of the wear resistant strip 40 tends to resist the abrasive action of the excess coating material C being wiped or doctored away by the blade and returned by gravity to the reservoir 52 below.

A creping blade comprising a steel strip about 0.050 inches thick, a wear land approximately 0.015 inches wide, a recessed wear resistant strip of thermally sprayed chromia about one-eighth inches wide by approximately 0.020 inches thick was tested in a paper machine. After 64 hours only about 0.015 inches of the total width of the wear resistant strip was in contact with the drum. At this rate of wear, the life expectancy of the creping blade is increased considerably before the top surface becomes too thin to effectively crepe the paper. Wear resistant blades made according to the invention will last considerably longer than a conventional blade under the same conditions.

Although the preferred embodiment of the invention is disclosed, by example, as a creping blade used in conjunction with a cylinder of a paper making machine, it is obvious that the wear resistant blade of the invention may be utilized cooperatively with a surface of a cylinder drum or roll to perform a variety of other well known operations known as doctoring. Doctoring operations include metering blades, coating blades, surface cleaning blades, used in various types of sheet, strip, and sheet forming and processing equipment utilized in a number of industries.

As used hereinabove, "a moving surface on the drum or cylinder" includes any surface of the cylinder or drum itself, an exposed surface of a layer of material such as a sheet, strip, web or layer of coating material in engagement with the drum or cylinder and which surface moves relative to the blade at least partially, concentrically about the axis of the drum or cylinder.

It will be apparent from the foregoing description that a useful and exceptionally long lasting wear resistant blade with many uses is hereby provided by the invention and that many modifications may be made of the invention without departing from the scope of the appended claims.

What is claimed is:

1. A surface conforming wear resistant doctor blade used in combination with a rigid cylinder for engaging and doctoring a relatively moving surface on the cylinder comprising:
   a substantially flat strip having
      a top surface,
      a side surface extending from the top surface,
      a leading edge at the junction of the top and side surfaces for doctoring the moving surface,
      a narrow wear land including the leading edge, on a portion of the side surface adjoining the leading edge, for engaging and conforming quickly to the moving surface on the cylinder at a relatively rapid rate of wear,
      a shallow slot on the side surface,
      a recessed surface and at least one shoulder within the slot adjoining the wear land; and
   a strip of wear resistant material, for contacting the moving surface on the cylinder and decreasing the rate of wear of the wear land including the leading edge after the wear land and leading edge have conformed to and doctors the moving surface, situated in the shallow slot abutting the shoulder and bonded to the recessed surface, the strip of wear resistant material being harder than the wear land and having
      an edge abutting the wear land and extending close to and substantially parallel to the leading edge;
   whereby upon engaging the moving surface on the cylinder the narrow wear land including the leading edge quickly conforms to and doctors the moving surface, the strip of wear resistant material upon contacting the moving surface reduces and controls the rate of wear thereby extending the life of the blade, and the strip of wear resistant material is continually protected by the wear land.

2. A wear resistant blade according to claim 1 wherein the flat strip is comprised of a metal selected from a group consisting of hot rolled steel, cold rolled steel, spring steel, stainless steel, nickel, nichrome, monel metal, brass, bronze and alloys thereof.

3. A wear resistant blade according to claim 1 wherein the strip of wear resistant material is comprised of a ceramic material selected from a group consisting of alumina, chromia, chromia alumina, alumina-titania, nickel oxide, aluminum silicate, zirconia, calcium zirconate, zirconium silicate, magnesium zirconate, magnesium aluminate, tungsten carbide, chromium carbide, zirconium carbide, tantalum carbide, titanium carbide, zirconium diboride, chromium diboride, titanium diboride, molybdenum diboride, and mixtures thereof.

4. A wear resistant blade according to claim 3 wherein the strip of wear resistant material is a layer of thermally sprayed material.

5. A wear resistant blade according to claim 4 further comprising:
   a metal undercoat between the strip of wear resistant material and the flat strip.

6. A surface conforming wear resistant doctor blade used in combination with a rigid cylinder and for engaging and doctoring a relatively moving surface on the cylinder having
   a leading edge for doctoring the moving surface;
   a side surface extending from the leading edge;
   a wear land, including the leading edge on a portion of the side surface adjoining the leading edge, subject to wear by and conforming quickly to the moving surface at a relatively rapid rate of wear;
   a shallow slot in the side surface;
   a recessed surface and at least one shoulder within the slot adjoining the wear land; and
   a strip of wear resistant material in the shallow slot abutting the shoulder and bonded to the recessed surface including a wear resistant surface, adjoining the wear land on the side surface, and extending substantially parallel to the leading edge, the wear resistant surface being of greater hardness than the wear land and displaced from the leading edge in a direction of movement of the moving surface for contacting the moving surface and decreasing the rate of wear of the wear land including the leading edge after the wear land and the leading edge have conformed to and doctors the moving surface;

whereby, upon engaging the moving surface the wear land and the leading edge quickly conforms to and doctors the moving surface, the strip of wear resistant material upon contacting the moving surface reduces and controls the rate of wear thereby extending the life of the blade, and the strip of wear resistant material is continually protected by the wear land.

7. A wear resistant blade according to claim 1 further comprising:

a backing strip of softer material than the wear resistant material recessed a predetermined distance from the edge abutting the wear land and the wear land, into the strip of wear resistant material;

whereby wear resistant material extends from the wear land and between the flat strip and the backing strip.

8. A wear resistant blade according to claim 1 further comprising:

a second shallow slot in the strip of wear resistant material having a recessed surface and at least one shoulder substantially parallel to the recessed surface and the at least one shoulder in the first mentioned shallow slot; and a backing strip of softer material than the strip of wear resistant material, bonded to the recessed surface and the at least one shoulder in the second shallow slot.

9. A wear resistant blade according to claim 7 wherein the flat strip and the backing strip are each comprised of a metal selected from a group consisting of hot rolled steel, cold rolled steel, spring steel, stainless steel, nickel, nichrome, monel metal, brass, bronze and alloys thereof.

10. A wear resistant blade according to claim 7 wherein the strip of wear resistant material is comprised of a ceramic material selected from a group consisting of alumina, chromia, chromia alumina, alumina-titania, nickel oxide, aluminum silicate, zirconia, calcium zirconate, zirconium silicate, magnesium zirconate, magnesium aluminate, tungsten carbide, chromium carbide, zirconium carbide, tantalum carbide, titanium carbide, zirconium diboride, chromium diboride, titanium diboride, molybdenum diboride, and mixtures thereof.

11. A wear resistant blade according to claim 10 wherein the strip of wear resistant material and the backing strip are each comprised of a layer of thermally sprayed material.

12. A wear resistant blade according to claim 11 further comprising:

a metal undercoat between the strip of wear resistant material and the flat strip.

13. A surface conforming wear resistant doctor blade used in combination with a rigid cylinder and for engaging and doctoring a relatively moving surface on the cylinder having an edge for doctoring the moving surface;

a side surface extending from the edge;

a wear land including the edge, on a portion of the side surface adjoining the edge, subject to wear by and conforming quickly to the moving surface at a relatively rapid rate of wear a shallow slot in the side surface, a recessed surface and at least one shoulder within the slot adjoining the wear land; and a strip of wear resistant material in the shallow slot abutting the shoulder and bonded to the recessed surface including a wear resistant surface, adjoining the wear land on the side surface, and extending substantially parallel to the edge, the wear resistant surface being of greater hardness than the wear land and displaced from the edge for contacting the moving surface and decreasing the rate of wear of the wear land including the edge after the wear land and the edge have conformed to and doctors the moving surface;

whereby, upon engaging the moving surface the wear land including the edge quickly conforms to and doctors the moving surface, the strip of wear resistant material upon contacting the moving surface reduces and controls the rate of wear thereby extending the life of the blade, and the strip of wear resistant material is continually protected by the wear land.

14. A surface conforming wear resistant blade used in combination with a rigid cylinder and for engaging a relatively moving surface on the cylinder according to claim 13 wherein the edge is a trailing edge; and the wear resistant surface is displaced from the trailing edge in a direction opposite to the movement of the moving surface.

* * * * *